United States Patent [19]
Hawkins

[11] 3,888,084
[45] June 10, 1975

[54] THERMAL RECOVERY SYSTEM
[76] Inventor: Gilbert L. Hawkins, 305 Simmons Ave., Webster Groves, Mo. 63119
[22] Filed: May 20, 1974
[21] Appl. No.: 471,509

[52] U.S. Cl. .................... 60/614; 60/618; 60/655
[51] Int. Cl. ............................................. F01k 23/06
[58] Field of Search ............. 60/655, 618, 597, 614

[56] References Cited
UNITED STATES PATENTS

| | | | |
|---|---|---|---|
| 1,297,263 | 3/1919 | Simms | 60/618 |
| 1,339,177 | 5/1920 | Dyer | 60/618 |
| 2,196,979 | 4/1940 | Campbell | 60/618 |
| 3,228,189 | 1/1966 | Baker | 60/618 |

FOREIGN PATENTS OR APPLICATIONS

| | | | |
|---|---|---|---|
| 699,425 | 12/1930 | France | 60/618 |

Primary Examiner—Martin P. Schwadron
Assistant Examiner—Allen M. Ostrager

[57] ABSTRACT

The thermal recovery system is used in conjunction with an internal combustion engine cooling and exhaust system and includes a heat exchanger having a coil containing refrigerant which absorbs heat from the coolant leaving the engine to produce high pressure refrigerant gas. The gas is supplied to a refrigerant motor connected to the engine crankshaft, and gas discharged from the motor is pumped back to the heat exchanger. The coolant discharged from the first heat exchanger is passed to a second heat exchanger having a coil conveying engine exhaust gas which imparts heat to the coolant prior to being recycled to the engine. The coolant can be diverted to the engine radiator in the event that the engine becomes overheated.

6 Claims, 1 Drawing Figure 3,888,084

1

THERMAL RECOVERY SYSTEM

BACKGROUND OF THE INVENTION

This invention relates generally to a system for recovering waste heat from an internal combustion engine and particularly to a means of converting heat lost in the cooling and exhaust system into useful energy.

The combustion engine of a conventional automobile commonly utilizes only about one-third of the useful energy available in a gallon of gasoline, with the result that two-thirds of a gallon of gas is not converted into useful work. An increase in thermal efficiency is clearly desirable as it produces economy in gasoline and, in addition, quantitatively reduces the amount of pollutants discharged into the atmosphere because of the overall reduction of gasoline consumption.

A large proportion of the lost energy is represented by waste heat generated by the engine. Much of this waste heat is contained in the exhaust gases which escape to ambience. In most automobiles a liquid cooling system utilizing a fan-driven radiator is used to ensure that the engine does not overheat and a good deal of waste heat is dissipated by this means.

It is estimated that some sixty percent of the available energy in a gallon of gasoline is lost in waste engine heat. If, for example, eighty percent of this were recoverable the resulting overall gain in gasoline energy utilization would be 48 percent, which would more than double the present energy utilization.

Attempts have been made to conserve this waste heat generated by the engine. For example, one known apparatus utilizes the exhaust gases from a gasoline engine to heat a boiler which provides steam for running a steam engine. However, no apparatus is known which utilizes a refrigeration system to recover waste heat from an automobile engine in the manner disclosed herein.

SUMMARY OF THE INVENTION

This thermal recovery system utilizes the waste heat which is generated by an internal combustion engine, and normally dissipated in the cooling and exhaust system of the engine, and converts it into useful work.

It is an important object of this invention to utilize a refrigeration system to conserve a high proportion of the energy lost by waste heat in an automobile engine and use it to augment the horsepower output of the engine in a manner to substantially increase the gasoline energy utilization.

It is an object of the invention to provide a first coil means containing refrigerant; means delivering heat generated by the engine to the coil means for absorbtion by the refrigerant; and to provide motor means, operated by resulting high pressure refrigerant gas from the coil means, and power take-off means operatively connected to the motor means to utilize the work done by the motor means.

It is another object of the invention to provide pump means between the motor means and the first coil means to pump refrigerant from the motor means to the coil means.

Yet another object is to provide a first heat exchanger means between the outflow conduit and return conduit of the engine cooling system disposed in by-pass relation to the cooling system radiator, the first heat exchanger including the first coil means containing refrigerant to absorb heat from the coolant.

2

It is an object of the invention to provide a second heat exchanger between the first heat exchanger and the engine to receive coolant from the first heat exchanger, said second heat exchanger including a second coil means connected to the engine exhaust port to convey exhaust gases through the second heat exchanger to impart heat to the coolant prior to the entry of the coolant into the engine water jacket.

Yet another object is to provide drive means connecting the motor means and the engine crankshaft whereby the work done by the motor augments the power output of the engine; and to provide drive means between the motor means and the pump means whereby the motor means energizes the pump means.

Still another object is to provide the drive means between the motor means and the engine crankshaft with clutch means disengaging the motor means from the engine means and to provide cutoff valve means between the first coil means and the motor means to cut off the flow of refrigerant gas to the motor means said clutch means and cutoff valve means being provided with switch means for simultaneous disengagement of the clutch means and cutoff of the valve means.

It is an important object to provide thermostatically operated valve means disposed upstream of the radiator to selectively control flow through the first heat exchanger means by opening to divert flow to the radiator to provide additional cooling at a predetermined coolant temperature.

An object of the invention is to provide a condenser means and a receiver means between the motor means and the pump means to liquify the gas discharged from the motor means prior to delivery to the pump means.

It is an important object of the invention to provide a thermal recovery system which is relatively simple to manufacture, inexpensive to maintain and extremely efficient in operation.

DESCRIPTION OF THE PREFERRED EMBODIMENT

Figure 1:
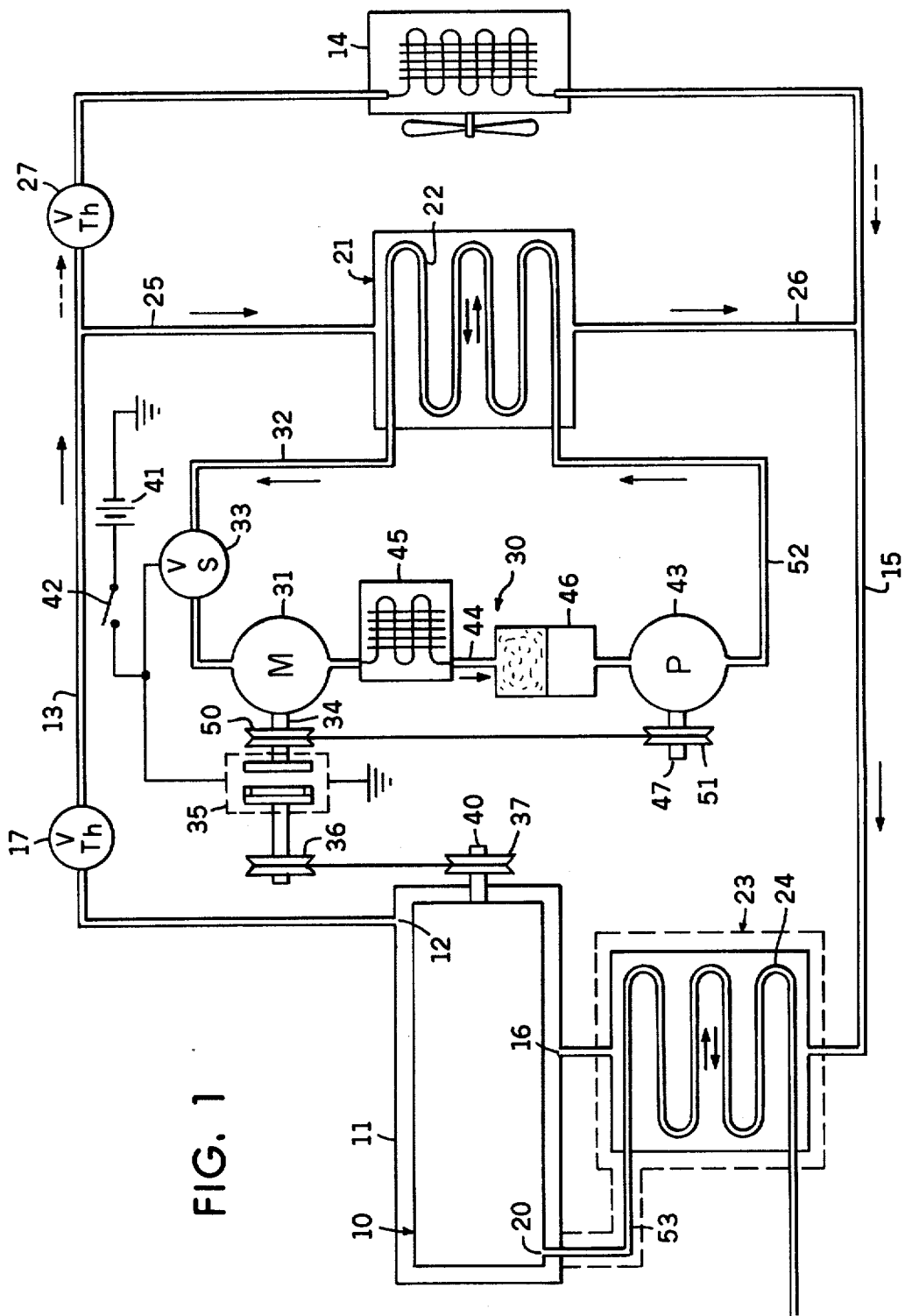
FIG. 1 is a schematic rendering of the thermal recovery system in combination with an internal combustion engine.

Referring now by characters of reference to the drawing, it will be understood that the thermal recovery system is used in combination with a cooling and exhaust system such as that provided on most automobiles. The cooling portion of the system is conventional in that liquid coolant, such as water, is heated by the engine 10 and passes from a water jacket 11 at a relatively high temperature through an outlet port 12 and into an outflow conduit 13 communicating with a fan-cooled radiator 14. The temperature of the coolant is lowered in the radiator 14 and the coolant returns to the water jacket 11 by way of a return conduit 15 to enter the water jacket 11 at the inlet port 16 at a reduced temperature. A thermostatically controlled valve 17 in the outflow conduit 13 restricts coolant circulation until the temperature of the engine reaches a predetermined value. The exhaust portion of the cooling and exhaust system is conventional in that hot gases are discharged from an engine exhaust port 20.

The thermal recovery system, in the preferred embodiment, includes a first heat exchanger 21 having a coil 22 containing refrigerant, which absorbs heat from the coolant, and a second heat exchanger 23 having a coil 24 conveying exhaust gases through the coolant to impart heat to the coolant before it enters the water jacket 11. Thus, the two heat exchangers 21 and 23 together with associated conduits provide a means of delivering heat generated by the engine 10 to a refrigerant for conversion into useful work.

The first heat exchanger 21 is disposed between the outflow conduit 13 and the return conduit 15 and communicates with said conduits 13 and 15 by means of conduits 25 and 26, which divert coolant flow from the radiator 14 and provide at least a partial by-pass of said radiator. A thermostatically controlled valve 27 is provided in the outflow line between the first heat exchanger 21 and the radiator 14, and until the heat of the coolant is sufficiently high to open said valve 27 the radiator 14 is completely by-passed. The valve 27 is set to open at a predetermined temperature, higher than that of valve 17, and is intended to divert coolant flow from the first heat exchanger 21 to the radiator 14 to ensure that the coolant does not overheat.

The first heat exchanger 21 provides, in effect, an evaporator stage for a closed refrigeration system. This system, generally indicated by numeral 30, includes a refrigerant operated, positive displacement rotary motor 31, which communicates with the coil 22 by means of a conduit 32, said conduit being provided with a solenoid operated cutoff valve 33. The refrigerant, such as Freon, absorbs heat from the coolant in the first heat exchanger 21 and is applied to the rotor of the positive displacement motor 31 as a pressurized gas. The motor 31 includes a driveshaft 34 and is connected to the engine crankshaft 40 by a drive means which includes an electrically operated clutch 35. The drive means also includes a pulley 36 which is belt-connected to an associated pulley 37 provided on the engine crankshaft 40. In effect, the drive means connecting the motor driveshaft to the engine crankshaft provides a power take-off means utilizing the useful work done by the motor 31. The clutch 35 and the solenoid valve 33 are powered by a battery 41 and both are energized by closing a switch 42.

The refrigerant gas is discharged from the motor 31 and delivered to a Freon pump 43 by means of a conduit means generally indicated by numeral 44, which communicates between said motor 31 and pump 43. In the embodiment described the refrigerant gas is passed through a finned condenser 45 and a receiver 46 and enters the pump 43 in liquid form. The pump 43 includes a shaft 47, which is rotated by the motor 31 by a drive means which includes a pulley 50, mounted to the pump drive shaft 47 and belt-connected to an associated pulley 51 mounted to the motor drive shaft 34. In effect, the motor 31 provides the means of energizing the pump means. Liquid refrigerant is returned to the heat exchanger coil 22 at high pressure by way of a conduit 52 communicating between said pump 43 and said coil 22.

Coolant discharged from the heat exchanger 21 enters the return conduit 15 by way of conduit 26 at a relatively low temperature. The second heat exchanger 23, which is insulated to minimize heat loss, is disposed between the first heat exchanger 21 and the water jacket 11, and provides a means of utilizing the heat of the engine exhaust gases to raise the temperature of the coolant prior to the entry of the cooling into the water jacket 11. To this end, the coil 24 communicates with the engine exhaust port 20 by means of conduit 53 so that exhaust gases pass through the coil 24 to impart heat to the coolant before discharge to ambience. The exhaust gases may be discharged to ambience indirectly by way of a muffler system (not shown), discharged discharge directly to ambience in those instances in which the second heat exchanger 23 provides adequate muffling.

It is thought that the structural features and functional advantages of this thermal recovery system have become fully apparent from the foregoing description of parts, but for completeness of the disclosure the operation of the system will be briefly summarized.

The thermostatically controlled valve 17 includes a weep hole (not shown) to provide minimum flow of coolant, to provide circulation and uniform heat distribution through the cooling system until the engine warms up sufficiently to open the valve 17.

When the engine 10 is idling, the switch 42 controlling the solenoid valve 33 and the electric clutch 35 is open so that both of these components are de-energized. In this condition there is no circulation of refrigerant through the refrigeration system 30 and the motor 31 is disengaged from the engine crankshaft 40. The pump 43 which is driven by the motor 31 is also inoperative.

In order to avoid overheating, as for example when the engine 10 is idle, the valve 27 in the outflow conduit 13 opens to partially divert coolant to the radiator 14. If, for example, the valve 17 opens at a predetermined temperature of 140°F. and the valve 27 opens at 195°F., then the radiator 14 will be completely by-passed when the coolant is within the temperature range of 140°–195°F. At temperatures above 195°F., on the other hand, the valve 27 will open and at least partially divert coolant through the radiator 14. The temperature of the coolant as it leaves the first heat exchanger 21 is considerably decreased. When the coolant is passed through the second heat exchanger 24, heat is absorbed from the exhaust gases so that the coolant enters the engine inlet 16 at a temperature higher than the temperature at which it was discharged from the first heat exchanger 21. The temperature of the coolant is further increased in the engine 10 before it is discharged from the engine outlet 12 to begin a new cycle. Ideally, heat absorbed from the coolant by the refrigerant in the first heat exchanger 21 must be substantially equal to the total heat gain of the coolant in the second heat exchanger 23 and the heat gain of the coolant in the engine water jacket 11, otherwise the temperature of the coolant will increase to the point where the valve 27 will open to provide the coolant with the additional heat loss in the radiator 14.

The switch 42 may be placed on the automobile steering wheel for manual operation or can be adapted to be closed automatically by using a throttle switch. Under normal engine operating conditions, the switch 42 is closed. Thus, when the switch 42 is closed, and when the temperature of the coolant is above the setting of the valve 17, coolant flows through the heat exchanger 21 and causes evaporation of the refrigerant. The refrigerant passes through the motor 31 and thereby provides supplementary power for transmission to the engine crankshaft 40. This power gain is significantly greater than the power required to drive the pump 43 resulting in an overall increase in the efficiency of the engine 10.

If, for example, Freon 114 (dichlorotetrafluoroethane) in coil 22 is heated to approximately 195°F. by coolant passing through the heat exchanger 21 and produces a gas pressure of 180 p.s.i. gauge, the motor 31 is provided with considerable torque. Refrigerant leaving the motor 31 to enter the condenser 45 at 140°F. and 70 p.s.i. gauge is liquified in the receiver 46 prior to entering the pump 43. Because of a direct belt connection to the motor shaft 34 the pump 43 operates continuously during operation of the motor 31.

It will be understood that the motor 31 is not intended as a substitute for the usual engine drive mechanism but rather augments the power of the engine and adds this horsepower and torque to the crankshaft 40.

I claim as my invention:

1. In combination with an internal combustion engine of the type having a cooling and exhaust system in which coolant is circulated from an engine outlet port at relatively high temperature through an outflow conduit to a radiator and from the radiator through a return conduit to an engine inlet port at a relatively low temperature, and in which exhaust gases are passed from the engine through an exhaust port, a thermal recovery system comprising:
   a. a first heat exchanger means operatively connected between the outflow conduit and the return conduit in by-pass relation to the radiator to receive coolant from the engine and discharge coolant into the return conduit, said first heat exchanger means including a first coil means containing refrigerant to absorb heat from the coolant,
   b. refrigerant operated motor means,
   c. conduit means delivering refrigerant from the first coil means to the motor means to energize the motor means,
   d. drive means operatively connecting the motor means and the engine crankshaft,
   e. pump means between the motor means and the first coil means,
   f. conduit means delivering refrigerant from the motor means to the pump means,
   g. drive means operatively connecting the motor means and the pump means to energize the pump means,
   h. conduit means delivering refrigerant from the pump means to the first coil means,
   i. a second heat exchanger means disposed in the return conduit to receive coolant from the first heat exchanger means and discharge coolant into the inlet port, said second heat exchanger means including a second coil means operatively connected to the engine exhaust port to convey exhaust gases and impart heat to the coolant prior to entering the inlet port.

2. A combination as defined in claim 1, in which:
   j. the drive means connecting the motor means and the engine crankshaft includes clutch means,
   k. the conduit means delivering refrigerant from the first coil means to the motor means includes cut-off valve means,
   l. switch means is provided for substantially simultaneous disengagement of the clutch means and the cut-off valve means.

3. A combination as defined in claim 1, in which:
   j. valve means is provided controlling flow through the outflow conduit including a thermostatically operated valve disposed between the first heat exchanger means and the radiator to selectively control coolant flow through the first heat exchanger means and the radiator, said valve opening to divert flow to the radiator at a predetermined coolant temperature.

4. A combination as defined in claim 1, in which:
   j. the motor means includes a driveshaft,
   k. the drive means connecting the motor means and the engine crankshaft includes clutch means selectively disengaging said driveshaft from the engine crankshaft, and
   l. the drive means connecting the motor means and the pump means is connected to said motor driveshaft.

5. A combination as defined in claim 1, in which:
   l. the conduit means delivering refrigerant from the motor means to the pump means includes a condenser means communicating with the motor means and a receiver means communicating with the evaporator means and the pump means.

6. In combination with an internal combustion engine of the type having a cooling and exhaust system in which coolant is circulated from an engine outlet port at relatively high temperature through an outflow conduit to a radiator and from the radiator through a return conduit to an engine inlet port at a relatively low temperature, and in which exhaust gases are passed from the engine through an exhaust port, a thermal recovery system comprising:
   a. a first heat exchanger means operatively connected between the outflow conduit and the return conduit in by-pass relation to the radiator to receive coolant from the engine and discharge coolant into the return conduit, said first heat exchanger means including a separate pass in heat exchange relationship with the coolant containing refrigerant to absorb heat from the coolant,
   b. refrigerant operated motor means,
   c. conduit means delivering refrigerant from the separate pass of the first heat exchanger means to the motor means to energize the motor means,
   d. drive means operatively connecting the motor means and the engine crankshaft,
   e. pump means between the motor means and the separate pass of the first heat exchanger means,
   f. conduit means delivering refrigerant from the motor means to the pump means,
   g. drive means for energizing the pump means,
   h. conduit means delivering refrigerant from the pump means to the separate pass of the first heat exchanger means,
   i. a second heat exchanger means disposed in the return conduit to receive coolant from the first heat exchanger means and discharge coolant into the inlet port, said second heat exchanger means including a separate pass in heat exchanger relationship with the coolant operatively connected to the engine exhaust port to convey exhaust gases and impart heat to the coolant prior to entering the inlet port.

* * * * *